(12) United States Patent
Anders et al.

(10) Patent No.: US 10,151,235 B2
(45) Date of Patent: Dec. 11, 2018

(54) DUCTED COMBUSTION SYSTEM FOR AN INTERNAL COMBUSTION ENGINE

(71) Applicant: Caterpillar Inc., Peoria, IL (US)

(72) Inventors: Jonathan W Anders, Peoria, IL (US); Kenth I Svensson, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 113 days.

(21) Appl. No.: 15/451,823

(22) Filed: Mar. 7, 2017

(65) Prior Publication Data

US 2018/0258836 A1 Sep. 13, 2018

(51) Int. Cl.
| F02B 23/06 | (2006.01) |
| F02B 23/00 | (2006.01) |
| F02F 3/28 | (2006.01) |
| F02M 61/18 | (2006.01) |

(52) U.S. Cl.
CPC .......... *F02B 23/00* (2013.01); *F02B 23/0651* (2013.01); *F02F 3/28* (2013.01); *F02M 61/182* (2013.01); *F02M 61/1813* (2013.01)

(58) Field of Classification Search
CPC .............. F02B 23/0645; F02B 23/0648; F02B 23/0651; F02M 61/182; F02M 61/1813
USPC ........................................................ 123/298
See application file for complete search history.

(56) References Cited

U.S. PATENT DOCUMENTS

| 8,967,129 B2 * | 3/2015 | Mueller | F02B 3/00 |
| | | | 123/193.4 |
| 9,803,538 B2 * | 10/2017 | Anders | F02B 23/0627 |
| 9,915,190 B2 * | 3/2018 | Koci | F02B 23/10 |
| 10,012,196 B1 * | 7/2018 | Qi | F02M 61/14 |
| 10,036,356 B2 * | 7/2018 | Svensson | F02M 55/00 |
| 2011/0083638 A1 * | 4/2011 | Stovell | F02B 23/0651 |
| | | | 123/307 |
| 2012/0318233 A1 * | 12/2012 | Bazyn | F02B 23/0651 |
| | | | 123/305 |
| 2016/0097360 A1 * | 4/2016 | Mueller | F02M 61/14 |
| | | | 123/294 |
| 2016/0298529 A1 | 10/2016 | Anders et al. | |
| 2018/0128228 A1 * | 5/2018 | Zhang | F02B 17/005 |

FOREIGN PATENT DOCUMENTS

| CN | 104180374 | 12/2014 |
| CN | 106050441 | 10/2016 |
| EP | 0692625 | 1/1996 |
| JP | 59120715 | 7/1984 |
| WO | 2016054362 | 11/2016 |

* cited by examiner

*Primary Examiner* — Erick Solis (57) ABSTRACT

A ducted combustion system for an internal combustion engine includes a combustion chamber, a fuel injector, and a plurality of ducts. The combustion chamber is defined between a flame deck surface of a cylinder head and a piston crown of a piston disposed within a cylinder bore. Further, the fuel injector is configured to inject fuel into the combustion chamber as a plurality of fuel jets. The plurality of ducts is disposed within the combustion chamber between the flame deck surface and the piston crown. The plurality of ducts is disposed such that each of the plurality of fuel jets at least partially enters one of the plurality of ducts. The at least one of the plurality of ducts is configured to move to vary an angle of a corresponding at least one of the plurality of fuel jets relative to a longitudinal axis of the fuel injector.

20 Claims, 12 Drawing Sheets

DUCTED COMBUSTION SYSTEM FOR AN INTERNAL COMBUSTION ENGINE

TECHNICAL FIELD

The present disclosure relates generally to ducted combustion systems for internal combustion engines. More particularly, the disclosure relates to variable angle ducted combustion systems for internal combustion engines.

BACKGROUND

Modern combustion engines may include one or more cylinders as part of the engine. The cylinder head and an associated piston may define a combustion chamber therebetween. Fuel for combustion is directly injected into the combustion chamber by, for example, a fuel injector which is associated with the cylinder, the fuel injector having at least one orifice disposed such that it can directly inject fuel into the combustion chamber.

Different mixtures and/or equivalence ratios of the fuel/air mixture may produce different results during combustion. A manner in which the injected fuel mixes and/or interacts with air and other environmental elements of the combustion chamber may impact the combustion process and associated emissions. Further, if the fuel and air mixing is inadequate, then suboptimal or abnormally large amounts of soot may form within the combustion chamber.

U.S. Patent Publication No. 2016/0298529 discloses ducted combustion within a combustion chamber of an engine. The patent publication discloses a conical duct structure defining a plurality of fixed position ducts that may form passageways corresponding to orifices of the fuel injector. The fuel jets may be channeled through the ducts into the combustion chamber.

SUMMARY OF THE INVENTION

According to an aspect of the disclosure a ducted combustion system for an internal combustion engine is disclosed. The ducted combustion system includes a combustion chamber, a fuel injector, and a plurality of ducts. The combustion chamber is defined between a flame deck surface of a cylinder head of the internal combustion engine and a piston crown of a piston disposed within a cylinder bore of the internal combustion engine. The fuel injector is configured to inject fuel into the combustion chamber as a plurality of fuel jets. Further, the plurality of ducts is disposed within the combustion chamber between the flame deck surface and the piston crown. The plurality of ducts is disposed such that each of the plurality of fuel jets at least partially enters one of the plurality of ducts, at least one of the plurality of ducts being configured to move to vary an angle of a corresponding at least one of the plurality of fuel jets relative to a longitudinal axis of the fuel injector.

According to another aspect of the disclosure an internal combustion engine is disclosed. The internal combustion engine includes a combustion chamber, a fuel injector, a plurality of ducts, and at least one actuator. The combustion chamber is defined between a flame deck surface of a cylinder head of the internal combustion engine and a piston crown of a piston disposed within a cylinder bore of the internal combustion engine. The fuel injector is configured to inject fuel into the combustion chamber as a plurality of fuel jets. The plurality of ducts is disposed within the combustion chamber between the flame deck surface and the piston crown. The plurality of ducts is disposed such that each of the plurality of fuel jets at least partially enters one of the plurality of ducts. Further, the at least one actuator is configured to selectively move at least one of the plurality of ducts to vary an angle of a corresponding at least one of the plurality of fuel jets relative to a longitudinal axis of the fuel injector.

According to yet another aspect of the disclosure a method for operating a ducted combustion system is disclosed. The method includes injecting a plurality of fuel jets from a fuel injector into a combustion chamber. The method further includes directing each of the plurality of fuel jets into a corresponding one of a plurality of ducts disposed within the combustion chamber. The method also includes selectively moving at least one of the plurality of ducts to adjust an angle of a corresponding at least one of the plurality of fuel jets relative to a longitudinal axis of the fuel injector.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Figure 1:
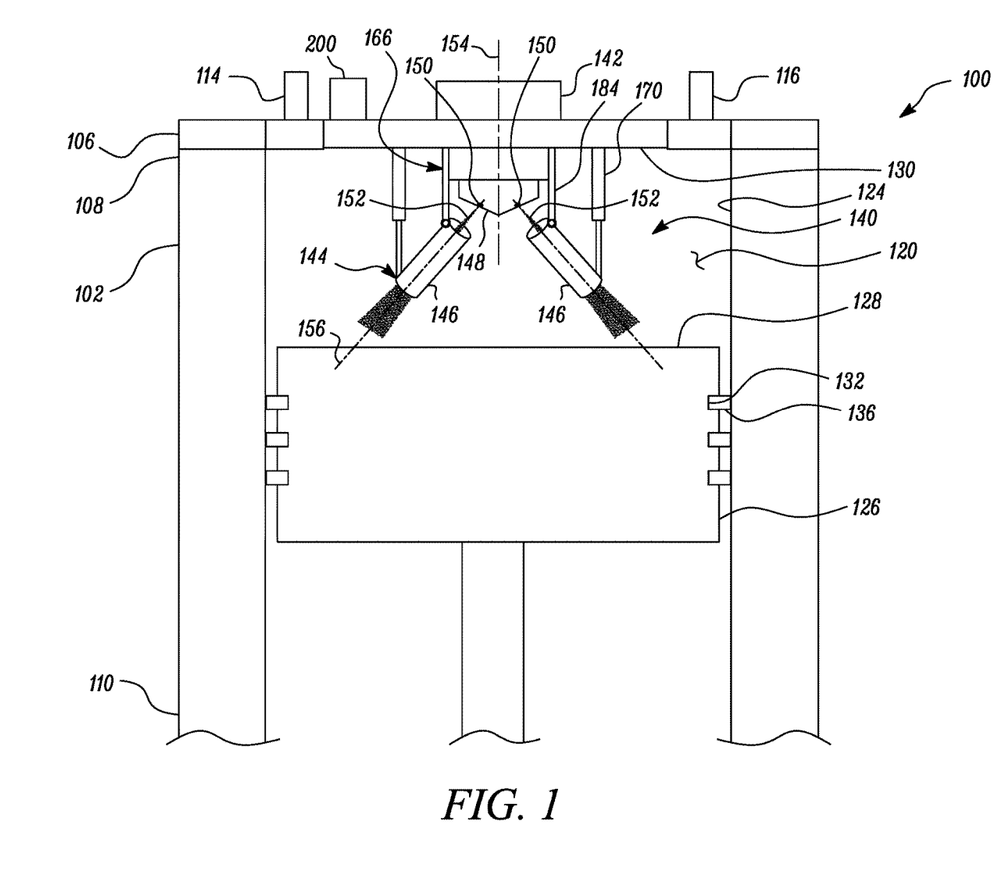
FIG. 1 illustrates a schematic view of an internal combustion engine including a ducted combustion system having a duct system, in accordance with an embodiment of the disclosure.

Referring to FIG. 1, one exemplary embodiment of an internal combustion engine 100 is disclosed. The internal combustion engine 100 is a reciprocating engine and may include a diesel engine, a gasoline engine, a gas engine, a two stroke engine, a four stroke engine, or any other similar internal combustion engine known in the art. The internal combustion engine 100 may include a cylinder 102, a cylinder head 106 coupled to a first end 108 of the cylinder 102, a crankcase (not shown) coupled to a second end 110 of the cylinder 102. The cylinder head 106 may act as a support structure for mounting various other components of the internal combustion engine 100 such as an intake valve 114, an exhaust valve 116, etc. The cylinder head 106 may include various features such as an intake conduit for allowing intake of air into a combustion chamber 120 and an exhaust conduit for facilitating discharge of exhaust gases from the combustion chamber 120.

The cylinder 102 includes a bore 124 extending from the first end 108 to the second end 110. The internal combustion engine 100 further includes a piston 126 that is disposed within the bore 124, and configured to reciprocate within the bore 124 between a top dead center of the cylinder 102 and a bottom dead center of the cylinder 102. The piston 126 includes a piston crown 128 that faces a flame deck surface 130 of the cylinder head 106. The piston 126 may further include other structural features such as a piston bowl to facilitate combustion of the fuel, a plurality of grooves 132 to receive a plurality of piston rings 136, etc.

Again referring to FIG. 1, the internal combustion engine 100 includes a ducted combustion system 140 having the combustion chamber 120, a fuel injector 142, and a duct system 144 including a plurality of ducts 146 disposed within the combustion chamber 120. The combustion chamber 120 is defined as an enclosure between the flame deck surface 130, the piston crown 128 and the bore 124 of the cylinder 102. Therefore, the combustion chamber 120 is bound at one end by the flame deck surface 130 of the cylinder head 106, and bound at another end by the piston crown 128 of the piston 126. Further, the combustion chamber 120 may be in fluid communication with the fuel injector 142 to receive fuel from the fuel injector 142.

The fuel injector 142 may be mounted in the cylinder head 106, and includes a tip 148 that protrudes within the combustion chamber 120 through the flame deck surface 130. The fuel injector 142 includes a plurality of orifices 150 formed at the tip 148 to directly inject fuel into the combustion chamber 120 as, for example, a plurality of fuel jets 152. The plurality of fuel jets 152 discharged by the fuel injector 142 are received by the duct system 144.

The duct system 144 includes the plurality of ducts 146 that receive the fuel jets 152 discharged by the fuel injector 142. The duct system 144 may be disposed within a flame region of the combustion chamber 120. The flame region may be defined as a region of the combustion chamber 120 extending from the flame deck surface 130 to the piston crown 128, when the piston 126 is at or close to a maximum compression distance or a top dead center (TDC) position. The plurality of ducts 146 may be disposed and arranged in the flame region such that the plurality of fuel jets 152 may enter the ducts 146 substantially, entirely or partially upon an injection from the plurality of orifices 150. In an embodiment, the ducts 146 may be arranged in a circular manner around a longitudinal axis 154 of the fuel injector 142 such that a longitudinal axis 156 of each duct 146 defines an angle relative to the longitudinal axis 154 of the fuel injector 142.

Referring to FIGS. 1-4, each duct 146 may include an inlet opening 160 that may have an opening width 'w1', and an outlet opening 162. To ensure that most of, if not all of, the fuel of each fuel jet 152 enters the corresponding duct 146 upon being injected, the opening widths 'w1' of the inlet openings 160 may be greater than the fuel jet widths. Also, a structure of the ducts 146 may converge and/or diverge in a flow direction of the fuel jets 152. In an embodiment, the ducts 146 may be divergent ducts that enable divergence of fuel jets 152 in a flow direction of the fuel jets 152. "Divergence in a flow direction of the fuel jets," as defined herein with reference to ducts 146, generally refers to a duct having a width that increases along a length of the duct, in the general direction of the flow of the fuel jets 152. Alternatively, the ducts 146 may be convergent ducts than enable convergence of the fuel jets 152 in a flow direction of the fuel jets 152. "Convergence in a flow direction of the fuel jets," as defined herein with reference to ducts 146, generally refers to a duct having a width that decreases along a length of the duct, in the general direction of the flow of the fuel jets 152.

Further, the duct system 144 may include a support structure 166 connected with the plurality of ducts 146 to suitably position and/or support each duct 146 within the combustion chamber 120. The support structure 166 may enable positioning of the ducts 146 such that the inlet opening 160 of each duct 146 aligns with corresponding orifice 150 of the fuel injector 142. In some examples, the ducts 146 may be directly affixed to the cylinder head 106 and/or the fuel injector 142, such that the ducts 146 are aligned with the orifices 150 of the fuel injector 142. In such examples, the support structure 166 may be omitted, and the cylinder head 106 and/or the fuel injector 142 may act as the support structure.

Furthermore, the duct system 144 includes at least one actuator 170 that is configured to move the plurality of ducts 146 to vary an angle of corresponding fuel jets 152 relative to the longitudinal axis 154 of the fuel injector 142. The actuator 170 may be a fluid cylinder 170' (shown in FIG. 3A), a spring actuator 170" (shown in FIG. 3B), or a motor assembly 170''' (shown in FIG. 3C). The fluid cylinder 170' and the motor assembly 170''' may be referred to as active actuators. The active actuators are the actuators which are generally controlled by controllers. Further, the spring actuators 170" may be referred as passive actuators. The passive actuators are the actuators that are self-actuated, and not controlled by any controller.

In certain implementations, the actuator 170 may be an actuating element coupled to the duct 146, and may be made of materials, such as but not limited to memory metals, bi-metals, etc. Use of such materials may enable the actuator 170 to pivot the duct 146 to vary an angle of the fuel jet 152 exiting the corresponding duct 146 based on, for example, a change in temperature inside the combustion chamber 120 or the actuating element. Such an actuator 170 may also be referred to as a passive actuator.

In an embodiment, the at least one actuator 170 may be omitted, and in such a case, the ducts 146 may be made of materials that may change an orientation of the ducts 146 to vary an angle of the fuel jet 152 exiting the corresponding duct 146. In certain implementations, the orientation may change based on, for example, a change in temperature inside the combustion chamber 120 or ducts 146.

Again referring to FIGS. 1-4, further details of the duct system 144 will now be discussed, according to an embodiment of the disclosure. Each duct 146 is defined by a tubular structure having a tubular wall 172 defining a passage 174 of the duct 146. Each duct 146 is pivotally coupled to the support structure 166 about a pivot axis 176. As shown, each duct 146 includes a first end 180 disposed proximal to the fuel injector 142, and a second end 182 disposed distal to the fuel injector 142. The first end 180 is pivotably coupled to the support structure 166, and the second end 182 is coupled to the corresponding actuator 170.

The support structure 166 may include a plurality of arms 184 extending from the cylinder head 106 or the fuel injector 142 into the combustion chamber 120. As shown, the first end 180 of each duct 146 is pivotably coupled to an end of the corresponding arm 184, and configured to pivot about the corresponding pivot axis 176. The pivot axis 176 of each duct 146 is defined by a pivotable connection of each duct 146 to the corresponding arm 184. For each duct 146, the pivot axis 176 is perpendicular to a first axis 186 of the duct 146 that passes through the corresponding pivotable connection. The first axis 186 extends along the length of the duct 146. The first axis 186 is parallel to the longitudinal axis 156 of each duct 146. Each duct 146 is configured to pivot about the corresponding pivot axis 176 to vary an angle of the corresponding fuel jet 152 relative to the longitudinal axis 154 of the fuel injector 142. Each duct 146 is pivoted by the corresponding actuator 170 connected to the second end 182 of the duct 146.

Figure 3A:
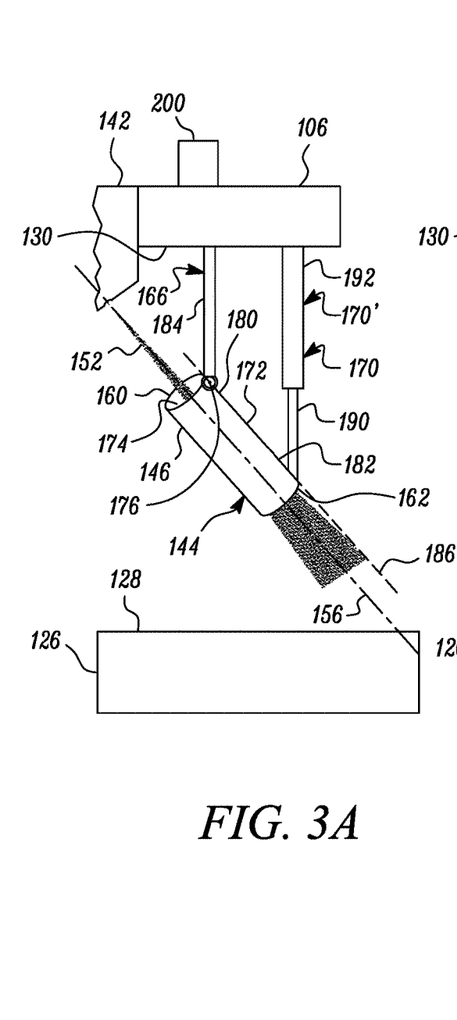
FIGS. 3A, 3B, and 3C illustrates a schematic view of the duct system disclosing different embodiments of an actuator of the duct system.

As shown in FIG. 3A, each actuator 170 may include the fluid cylinder 170' having a cylinder and piston-rod arrangement. In such a case, a piston rod 190 is coupled to the second end 182 of the respective duct 146, and an end of a cylinder 192 is coupled to the cylinder head 106 or the fuel injector 142. To pivot the duct 146 about the pivot axis 176, the piston rod 190 is extended or retracted relative to the cylinder 192 in a known manner.

Figure 3B:
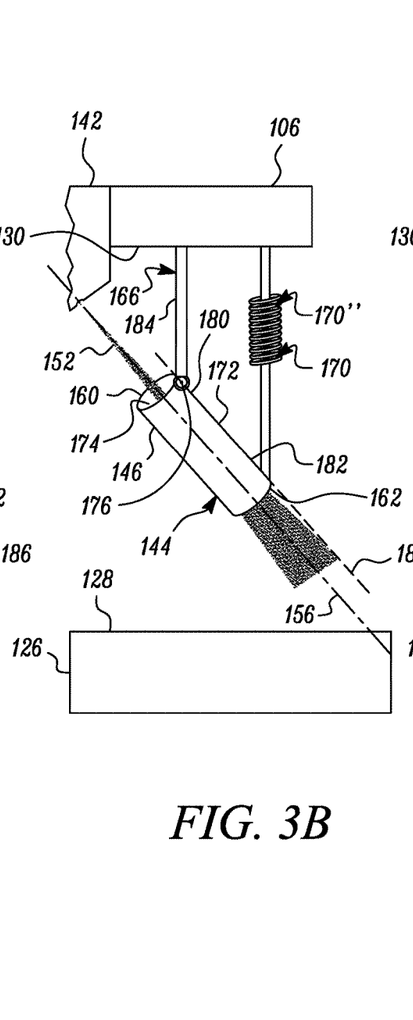

Further, as shown in FIG. 3B, each actuator 170 includes the spring actuator 170" coupled to the second end 182 of the corresponding duct 146, and coupled to the cylinder head 106 or the fuel injector 142. The spring actuator 170" is configured to pivot the respective duct 146, and therefore vary an angle of the corresponding fuel jet 152 exiting the duct 146 relative to the longitudinal axis 154 of the fuel injector 142. The spring actuator 170" may pivot the duct 146 about the corresponding pivot axis 176 due to a fuel flow force acting on the duct 146. The fuel flow force acting on the duct 146 may vary based on an injection rate of the fuel from the fuel injector 142. It may be appreciated that the fuel flow force acting on the duct 146 may also be a function of an angle of the fuel jet 152 and the flow of the fuel moving through the duct 146.

Figure 3C:
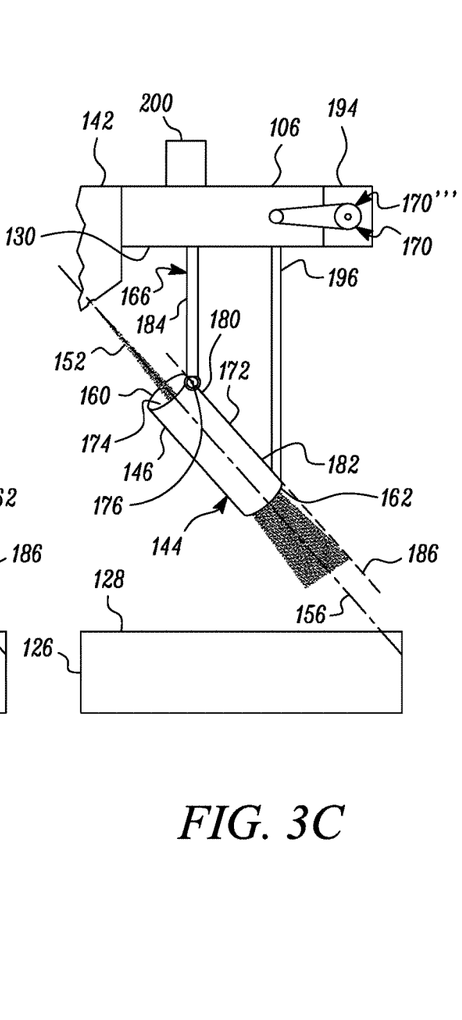

As shown in FIG. 3C, each actuator 170 may include the motor assembly 170''' that may include a motor 194 and an actuating element 196 connected to the second end 182 of the corresponding duct 146. The actuating element 196 is configured to move linearly in response to a rotation of the motor 194. The linear movement may cause a pivoting of the corresponding duct 146 about the respective pivot axis 176 to vary an angle of the corresponding fuel jet 152 relative to the longitudinal axis 154 of the fuel injector 142.

Figure 5:
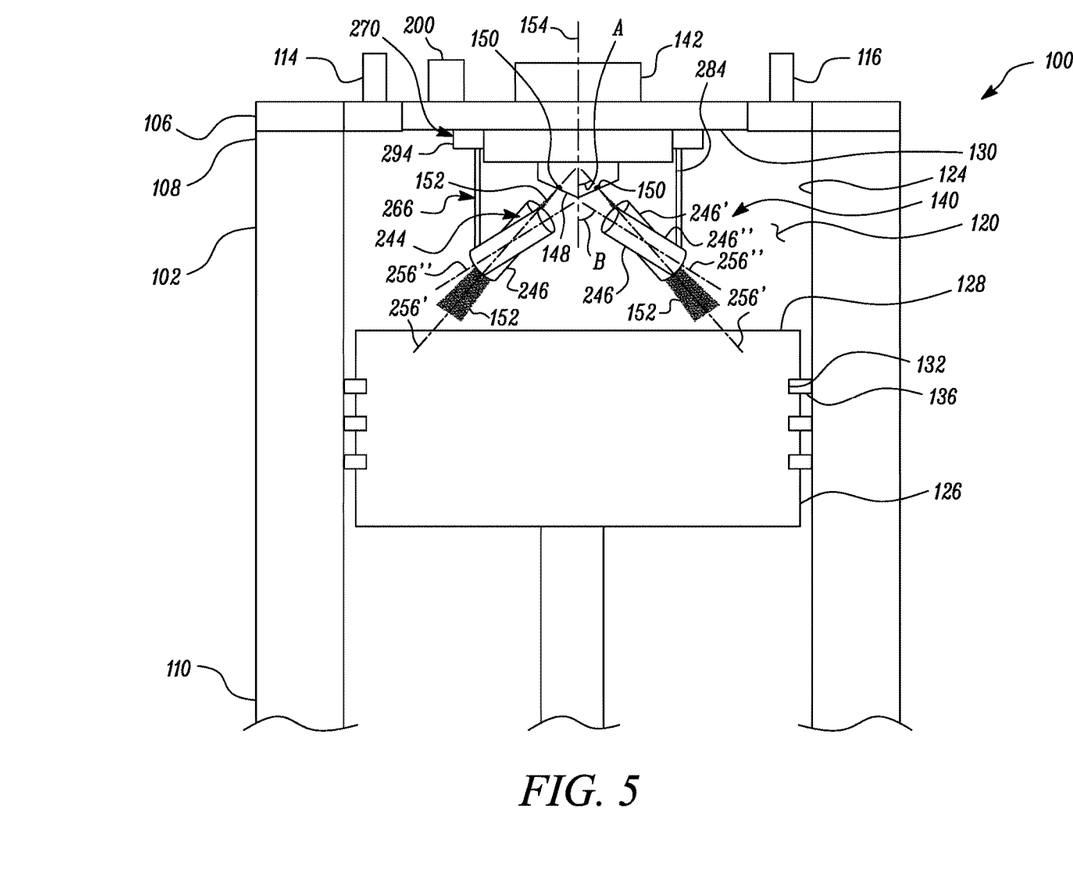
FIG. 5 illustrates a schematic view of the internal combustion engine including the ducted combustion system having a duct system, in accordance with an alternative embodiment of the disclosure.
Figure 6A:
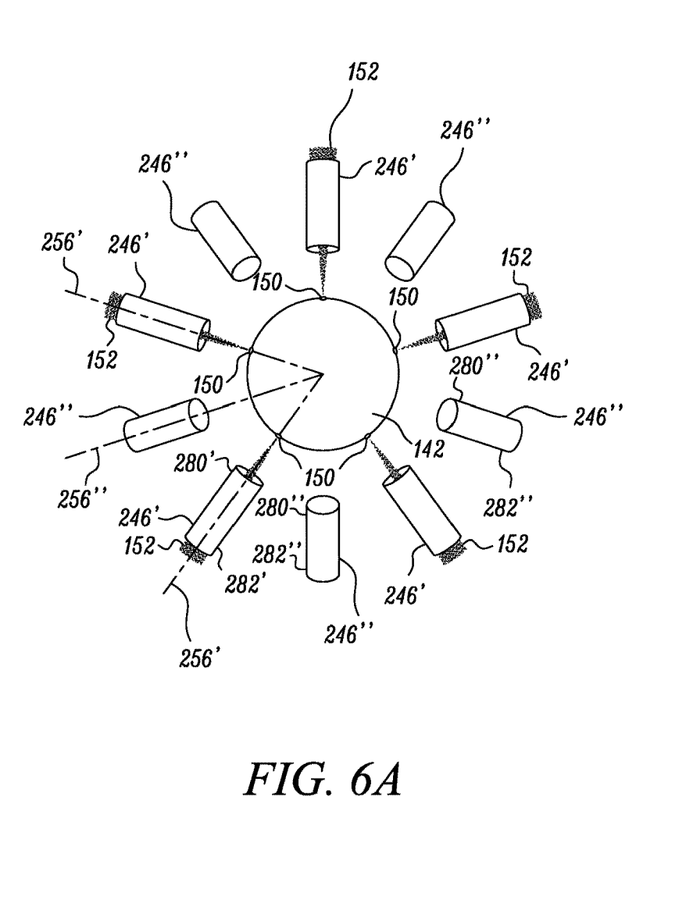
FIG. 6A illustrates a top schematic view of the ducted combustion system having the duct system of FIG. 5, and depicting a first set of ducts in alignment with a plurality of orifices of a fuel injector, in accordance with an embodiment of the disclosure.
Figure 6B:
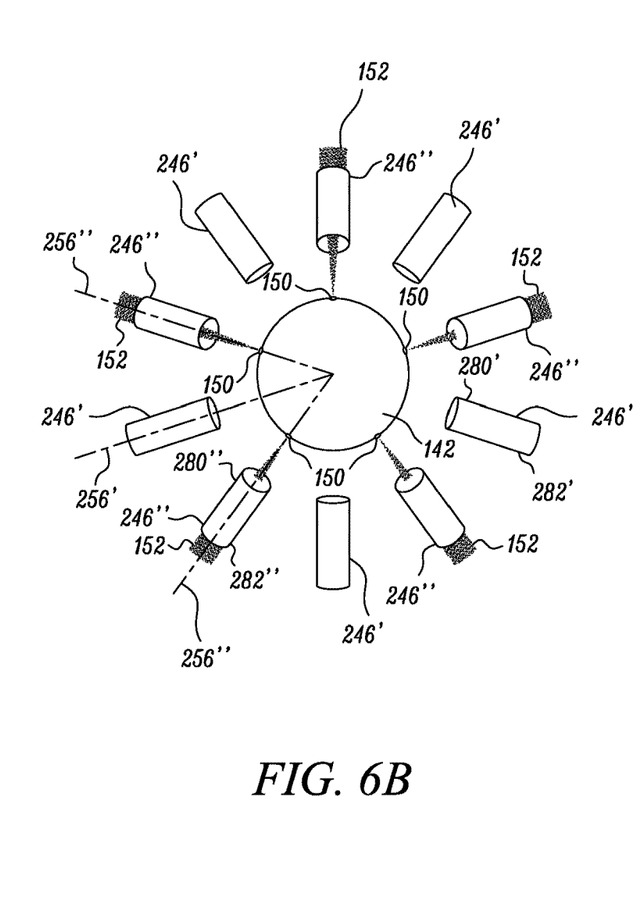
FIG. 6B illustrates a top schematic view of the ducted combustion system having the duct system of FIG. 5, and depicting a second set of ducts in alignment with the plurality of orifices of the fuel injector, in accordance with an embodiment of the disclosure.
Figure 7:
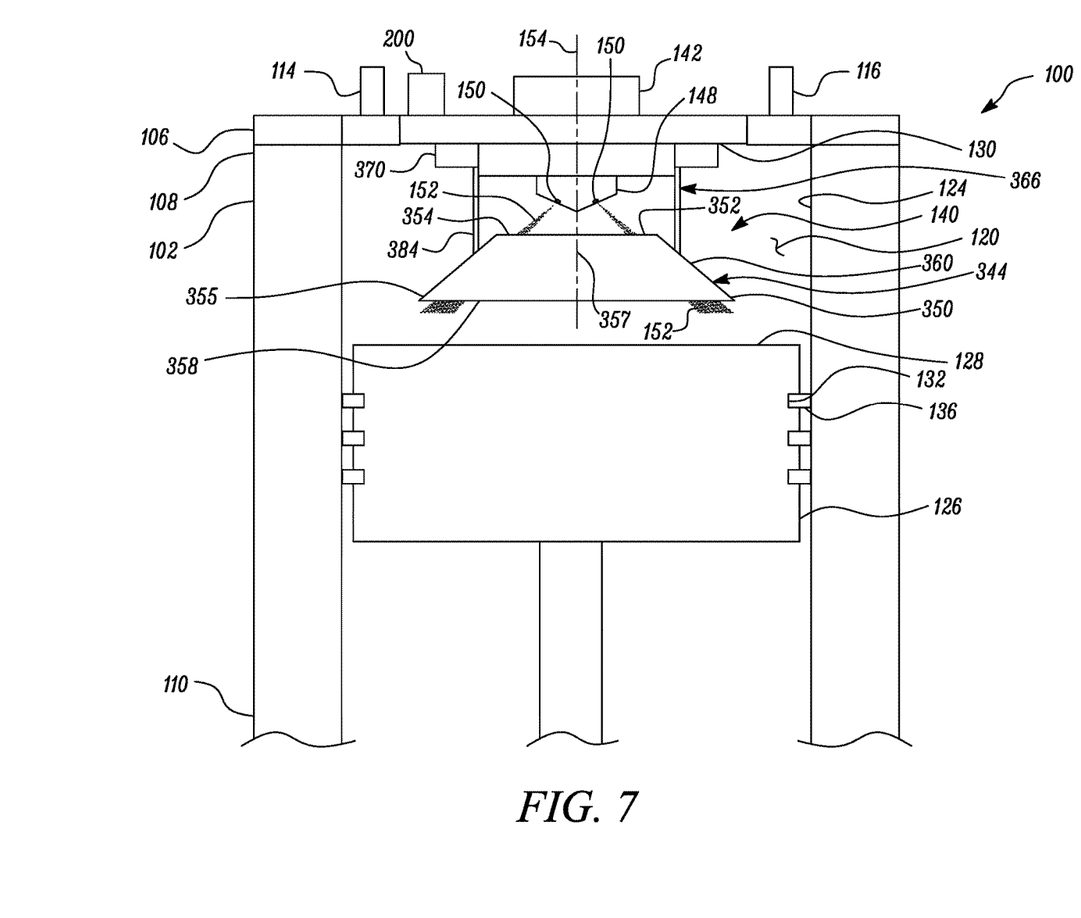
FIG. 7 illustrates a schematic view of the internal combustion engine including the ducted combustion system having a duct system, in accordance with an alternative embodiment of the disclosure.

Referring to FIGS. 5-6, a duct system 244 for the ducted combustion system 140 of the internal combustion engine 100 is shown. The duct system 244 is an embodiment of the duct system 144 as disclosed above. The duct system 244 includes a plurality of ducts 246 having a first set of ducts 246', and a second set of ducts 246", a support structure 266, and at least one actuator 270. Each duct 246' of the first set of ducts 246' includes a first axis 256' that is defined as a longitudinal axis of each duct 246', and each duct 246" of the second set of ducts 246" includes a second axis 256" that is defined as a longitudinal axis of each duct 246". Each first axis 256' may define an angle relative to the longitudinal axis 154 of the fuel injector 142 and termed as first angle, A, and each second axis 256" may define an angle relative to the longitudinal axis 154 of the fuel injector 142 and termed as second angle, B. The first angle, A, is different from the second angle, B. In an embodiment, the first angle, A, may be smaller than the second angle, B. Alternatively, the first angle, A, may be larger than the second angle, B. In certain implementations, the first set of ducts 246' and the second set of ducts 246" may be arranged in the combustion chamber 120 such that each duct 246' of the first set of ducts 246' may be disposed between successive ducts 246" of the second set of ducts 246", and vice versa.

Further, each duct 246', 246" is defined by a tubular structure having a first end 280', 280", respectively, positioned proximal to the fuel injector 142, and a second end 282', 282" positioned distal from the fuel injector 142. Each duct 246', 246" is positioned in the flame region of the combustion chamber 120, and is supported by the support structure 266. The plurality of ducts 246 is arranged within the combustion chamber 120 in such a manner that either the first set of ducts 246' align with the plurality of orifices 150 or the second set of ducts 246" align with the plurality of orifices 150. The support structure 266 may include a plurality of arms 284 (as shown in FIG. 5) coupled to one or more ducts 246' 246" at one end. Further, the support structure 266 is coupled to the actuator 270 (only one shown in FIG. 5). The actuator 270 is configured to rotate/move the support structure 266, which in turn moves/rotates the plurality of ducts 246 about the longitudinal axis 154 of the fuel injector 142.

Therefore, the actuator 270 is configured to rotate the plurality of ducts 246 to either align the first set of ducts 246' with the orifices 150 (shown in FIG. 6A) or align the second set of ducts 246" with the orifices 150 (shown in FIG. 6B). In this manner, an angle of the fuel jets 152 exiting the corresponding ducts 246', 246" may be varied relative to the longitudinal axis 154 of the fuel injector 142. In certain implementations, the actuator 270 may be a motor assembly having a motor 294 and an actuating element (not shown) coupled to the motor 294 and the support structure 266 to transfer a rotational motion of the motor 294 to the support structure 266. The motor 294 may be an electric motor or a fluid motor. Alternatively, the actuator 270 may include a fluid cylinder (not shown) and an actuating element (not shown) coupled to the fluid cylinder and support structure 266. The actuating element may be configured to convert a translation movement of the fluid cylinder into a rotational movement of the support structure 266 and in turn a rotational movement of the plurality of ducts 246.

Referring to FIGS. 7-11, a duct system 344 for the ducted combustion system 140 of the internal combustion engine 100 is shown. The duct system 344 is an embodiment of the duct system 244 as disclosed above. The duct system 344 includes a plurality of ducts 346 having a first set of ducts 346', and a second set of ducts 346", a support structure 366, and at least one actuator 370. The plurality of ducts 346 is defined as a plurality of passages 348 formed in a conical disc structure 350. The conical disc structure 350 is a hollow conical disc having a frusto-conical disc structure, and includes a first end 352 having a first end face 354, a second end 355 having a second end face 358, and a body 360 extending between the first end 352 and second end 355. Each passage 348 is formed into the body 360, and extends from first end 352 to the second end 355. Each passage 348 defines an opening 362 at the first end face 354, and an opening 364 at the second end face 358. The opening 362 at the first end face 354 defines an inlet opening of the corresponding duct 346', 346", and the opening 364 at the second end face 358 defines an outlet opening of the corresponding duct 346', 346". In certain implementations, the first set of ducts 346' and the second set of ducts 346" may be formed into the conical disc structure 350 such that each duct 346' of the first set of ducts 346' may be arranged between successive ducts 346" of the second set of ducts 346", and vice versa.

Further, each duct 346' of the first set of ducts 346' includes a first axis 356' that is defined as a longitudinal axis of each duct 346', and each duct 346" of the second set of ducts 346" includes a second axis 356" that is defined as a longitudinal axis of each duct 346". Further, the conical disc structure 350 is positioned within the combustion chamber 120 such that the first end 352 is proximal to the fuel injector 142, the second end 355 is distal from the fuel injector 142, and a longitudinal axis 357 of the conical disc structure 350 may coincide with the longitudinal axis 154 of the fuel injector 142. The conical disc structure 350 may be positioned within the flame region such that each first axis 356' may define an angle relative to the longitudinal axis 154 of the fuel injector 14. This angle is termed as first angle, A'. Further, each second axis 356" may define an angle relative to the longitudinal axis 154 of fuel injector 142 and termed as second angle, B'. The first angle, A' is different from the second angle, B'. In an embodiment, the first angle, A', may be smaller than the second angle, B'. Alternatively, the first angle, A', may be larger than the second angle, B'. Further, the plurality of ducts 346 is arranged within the combustion chamber 120 in such a manner that either the first set of ducts 346' align with the plurality of orifices 150 (shown in FIG. 8) or the second set of ducts 346" (shown in FIG. 10) align with the plurality of orifices 150.

The conical disc structure 350, and therefore each duct 346', 346" of the plurality of ducts 346, are supported by the support structure 366. In an exemplary embodiment, the support structure 366 may include a plurality of arms 384 having an end coupled to the body 360 of the conical disc structure 350. Further, the support structure 366 is coupled to the actuator 370 (only one shown in FIGS. 7, 8, and 10). The actuator 370 is configured to rotate/move the support structure 366, which in turn moves/rotates the plurality of ducts 346 about the longitudinal axis 154 of the fuel injector 142. Therefore, the actuator 370 is configured to rotate the plurality of ducts 346 to either align the first set of ducts 346' with the orifices 150 or align the second set of ducts 346" with the orifices 150. In this manner, an angle of the fuel jets 152 exiting the corresponding ducts 346 may be varied relative to the longitudinal axis 154 of the fuel injector 142.

In certain implementations, the actuator 370 may be a motor assembly having a motor and an actuating element coupled to the motor and the support structure 366 to transfer a rotational motion of the motor to the support structure 366 and in turn a rotational movement of the plurality of ducts 346. The motor may be an electric motor or a fluid motor. Alternatively, the actuator 370 may include a fluid cylinder and an actuating element coupled to the fluid cylinder and support structure 366. The actuating element may be configured to convert a translational movement of the fluid cylinder into a rotational movement of the support structure 366 and in turn a rotational movement of the plurality of ducts 346.

Further, the ducted combustion system 140 may include a controller 200 to actuate at least one actuator 170', 170''', 270, 370 to move one or more of the plurality of ducts 146, 246, 346 to vary an angle of the corresponding one or more fuel jets 152 exiting the one or more of the plurality of ducts 146, 246, 346. In an embodiment, the controller 200 may be an engine control module (ECM). Alternatively, the controller 200 may be a separate control unit configured to control actuation of the at least one actuator 170', 170''', 270, 370. The controller 200 may monitor various engine operating parameters such as a cylinder pressure, timing of fuel injection, engine speed, engine power, a load on the engine 100 etc., to determine a suitable angle for each fuel jet 152 relative to the longitudinal axis 154 of the fuel injector 142. The controller 200 may include various maps, tables, mathematical models etc., to determine an angle of each fuel jet 152 relative to the longitudinal axis 154 of the fuel injector 142 based on the one or more engine operating parameters. After determining the angle, the controller 200 may control the at least one actuator 170', 170''', 270, 370 and move one or more of the plurality of ducts 146, 246, 346 to vary the angle of corresponding fuel jet 152 exiting the one or more of the plurality of ducts 146, 246, 346 relative to the longitudinal axis 154 of the fuel injector 142.

INDUSTRIAL APPLICABILITY

Figure 11:
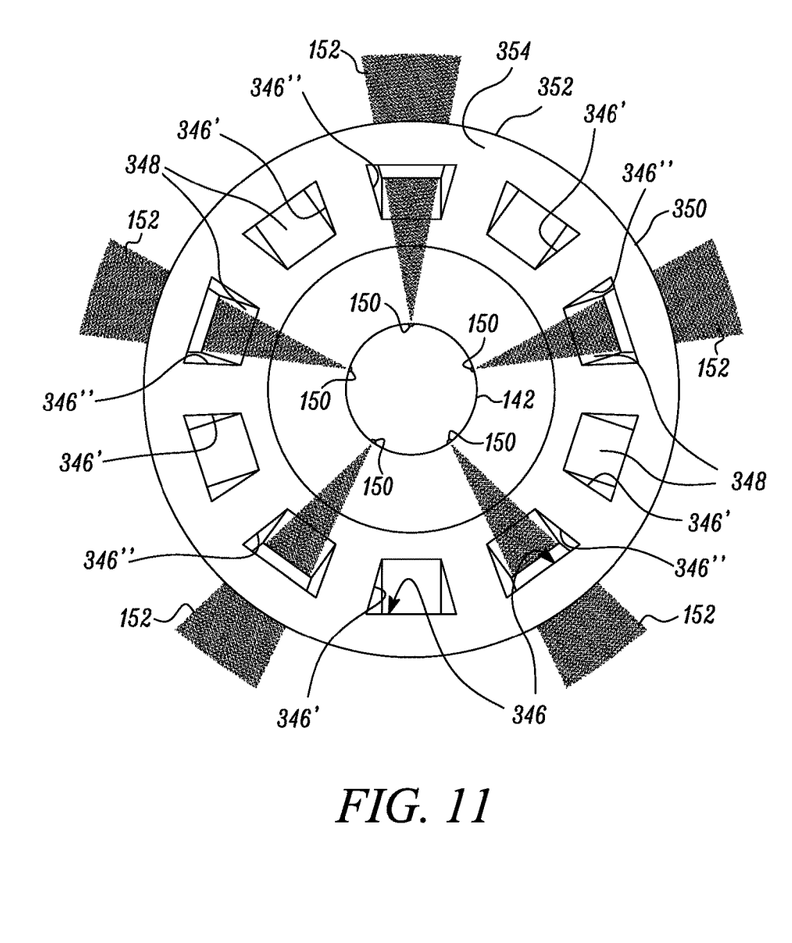
FIG. 11 illustrates a top schematic view of the ducted combustion system having the duct system of FIG. 7, and depicting the second set of ducts in alignment with the plurality of orifices of the fuel injector, in accordance with an embodiment of the disclosure.
Figure 12:
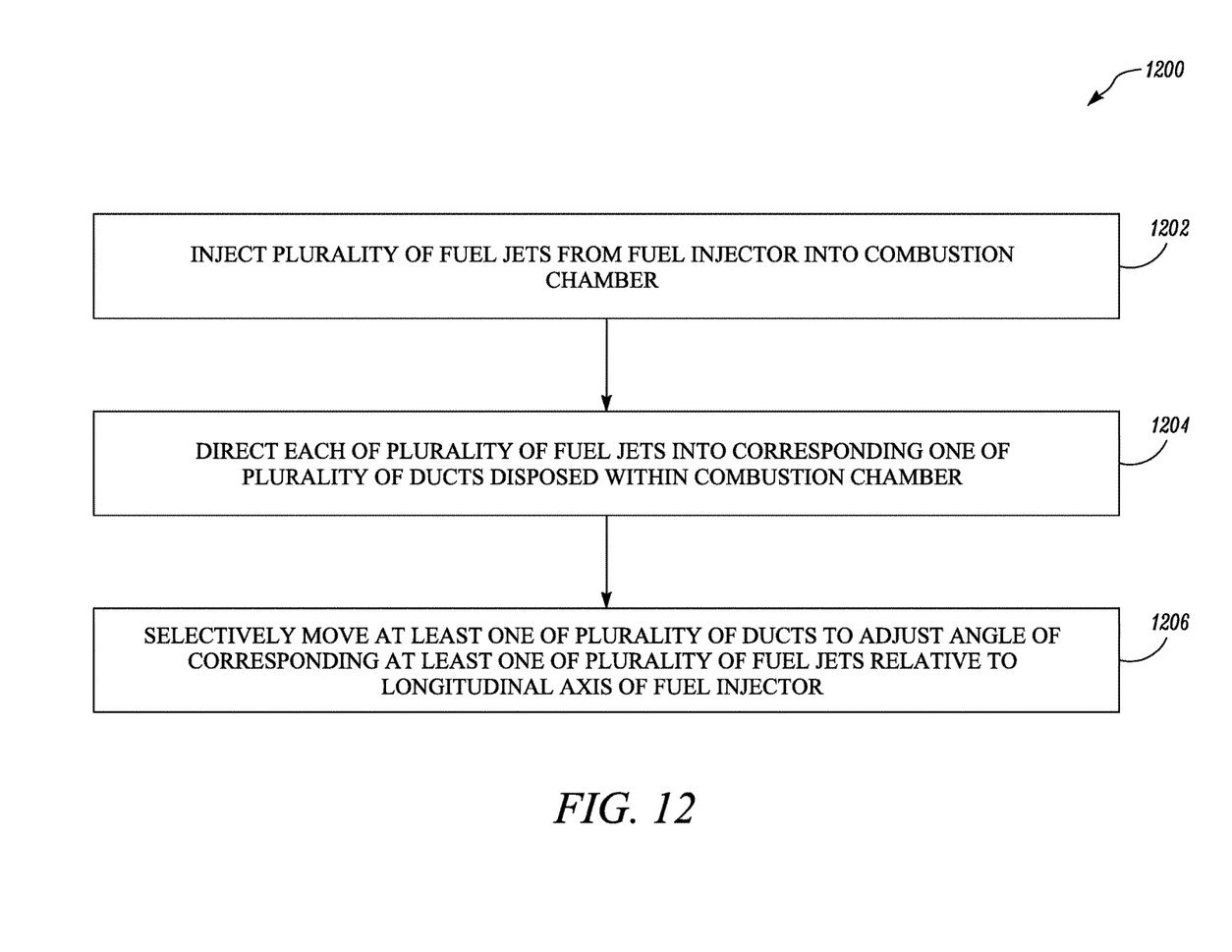
FIG. 12 illustrates a method for operating the ducted combustion system, in accordance with an embodiment of the disclosure.

Referring to FIG. 12, an exemplary method for operating the ducted combustion system 140 is described. The method is described by way of a flowchart 1200. The flowchart 1200 is described in conjunction with FIGS. 1-11. The method starts at step 1202.

At step 1202, the fuel injector 142 injects the plurality of fuel jets 152 into the combustion chamber 120. The plurality of fuel jets 152 may be injected into the combustion chamber 120 at an angle relative to the longitudinal axis 154 of the fuel injector 142. The method proceeds to step 1204.

Figure 2:
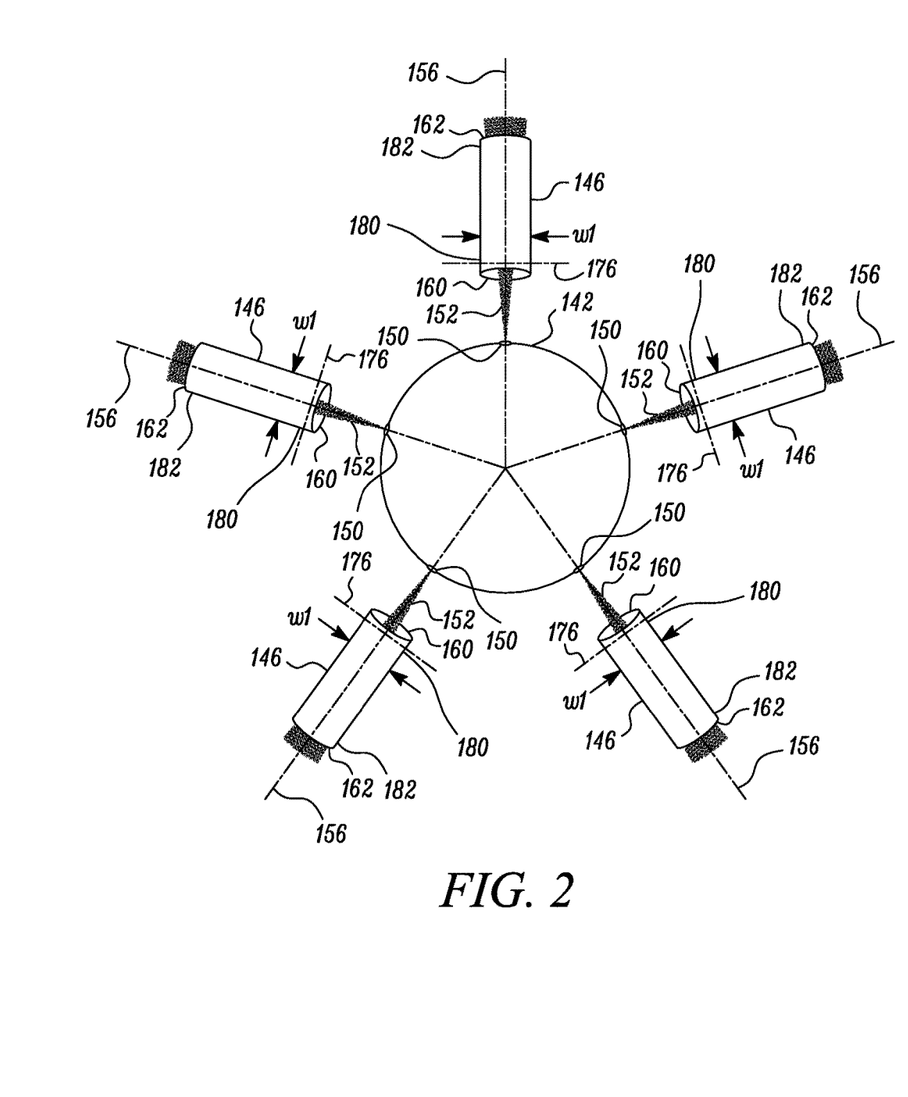
FIG. 2 illustrates a top schematic view of the ducted combustion system, in accordance with an embodiment of the disclosure.
Figure 8:
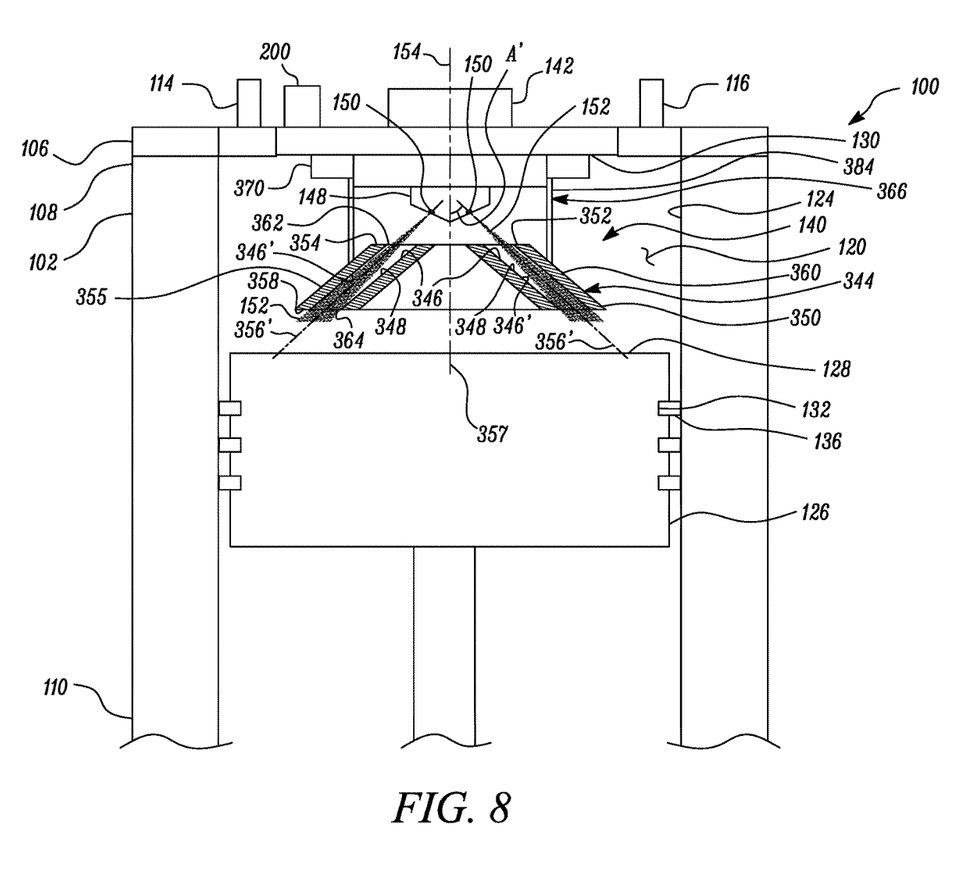
FIG. 8 illustrates a schematic view of the ducted combustion system having the duct system of FIG. 7, and depicting a sectional view of a conical disc structure showing a first set of ducts, in accordance with an embodiment of the disclosure.
Figure 9:
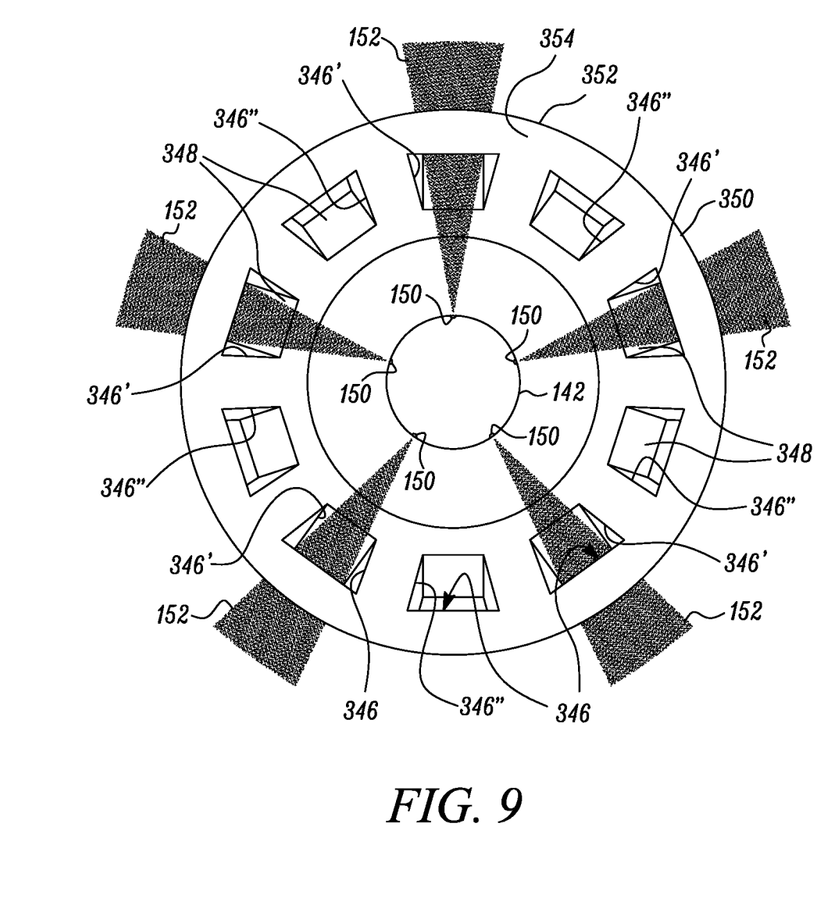
FIG. 9 illustrates a top schematic view of the ducted combustion system having the duct system of FIG. 7, and depicting the first set of ducts in alignment with the plurality of orifices of the fuel injector, in accordance with an embodiment of the disclosure.

At step 1204, each of the plurality of fuel jets 152 that exit the orifices 150 is directed into corresponding ducts 146, 246, 346 that are disposed within the combustion chamber 120 and are aligned with the orifices 150. With reference to FIG. 2, each duct 146 is in alignment with a corresponding orifice 150, and each duct 146 receives one or more fuel jets 152. As shown in FIGS. 6A, 8, and 9, as the first set of ducts 246', 346' are in alignment with the orifices 150, each duct 246', 346' of the first set ducts 246', 346' receives the corresponding fuel jets 152, while the second set of ducts 246", 346" may not receive the fuel jets 152 as the ducts 246", 346" are out of alignment with the orifices 150. The method proceeds to step 1206.

At step 1206, depending upon a fuel injection timing and/or a fuel injection pattern, the at least one of the plurality of ducts 146, 246, 346 is selectively moved to adjust an angle of a corresponding fuel jet 152 exiting the ducts 146, 246, 346 relative to a longitudinal axis 154 of the fuel injector 142. In an embodiment, the controller 200 may move at least one of the plurality of ducts 146, 246, 346 between a first fuel injection event and a second fuel injection event. In certain implementations, the first fuel injection event may refer to a main fuel injection event, and the second fuel injection event may refer to a pilot/post fuel injection event. Further, in certain scenarios, the controller 200 may move at least one of the plurality of ducts 146, 246, 346 during a fuel injection event itself, such as during the main fuel injection event itself. The controller 200 may actuate the at least one actuator 170', 170''', 270, 370 to move the at least one of the plurality of ducts 146, 246, 346.

In certain other implementations, for example as shown in FIG. 3B, the actuator 170'' may move/pivot at least one of the plurality of ducts 146 about the pivot axis 176 based on a change in the fuel flow force acting on the corresponding duct 146, and thereby change an angle of the corresponding fuel jet 152 relative to the longitudinal axis 154 of the fuel injector 142. The ducts 146 may move/pivot between the first fuel injection event and the second fuel injection event or during a single fuel injector event itself. As each duct 146 is moved by a separate actuator 170'', it may be appreciated that each duct 146 may be separately pivoted by a different angle to vary an angle of the corresponding fuel jet 152 relative to the longitudinal axis 154 of the fuel injector 142.

Figures 4A, 4B, 4C:
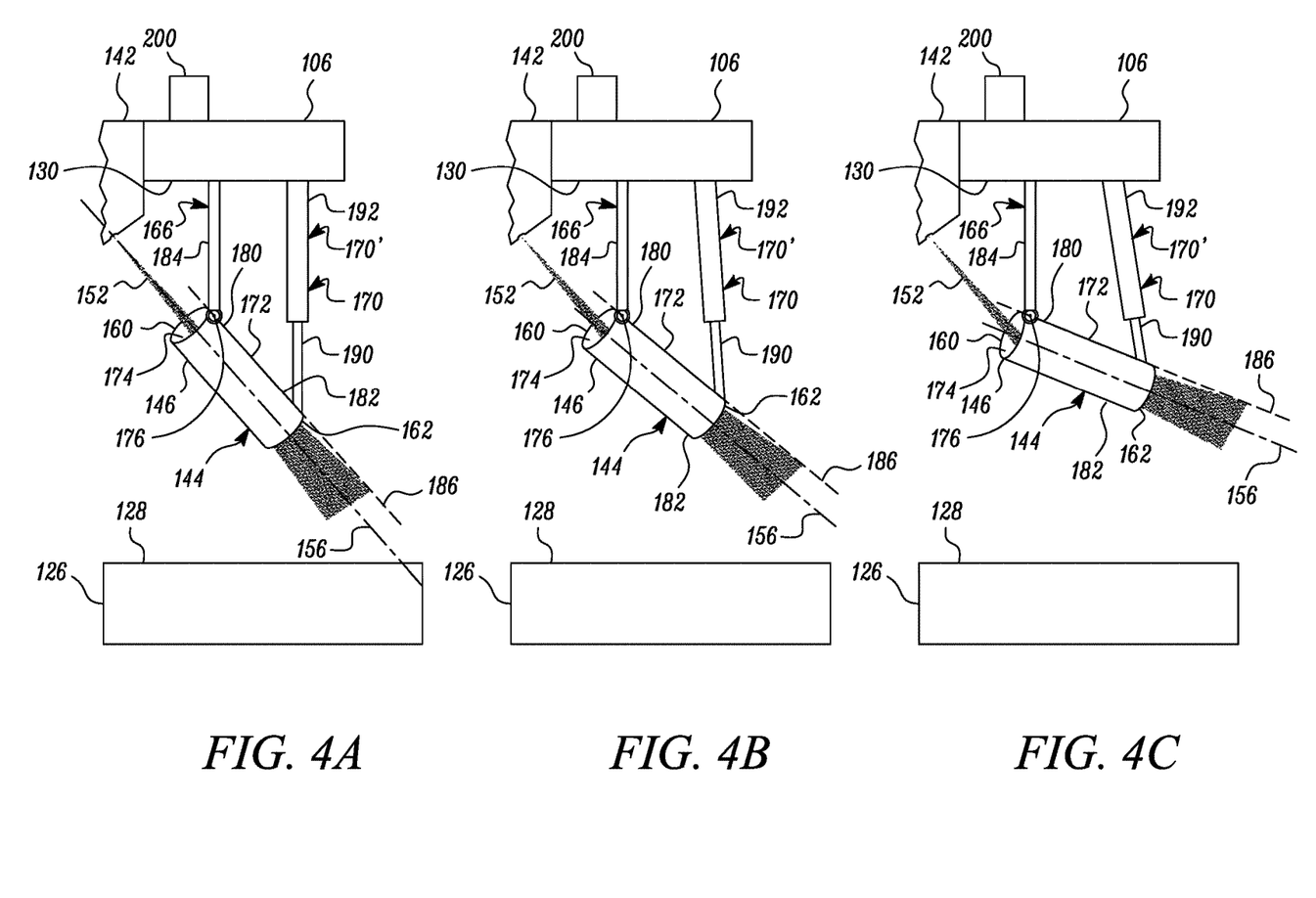
FIGS. 4A, 4B, and 4C illustrates different positions of a duct of the duct system, in accordance with an embodiment of the disclosure.

In an embodiment, as shown in FIGS. 1, 3A, 3C, 4A, 4B, and 4c, the controller 200 may move at least one of the plurality of the ducts 146 by operating the corresponding actuator 170', 170''' and moving/pivoting at least one of the plurality of ducts 146 about the pivot axis 176 of each corresponding duct 146. As each duct 146 is moved by a separate actuator 170', 170''' it may be appreciated that each duct 146 may be separately pivoted by a different angle to vary an angle of the corresponding fuel jet 152 relative to the longitudinal axis 154 of the fuel injector 142. As shown in FIGS. 4A, 4B, and 4C, three different pivot positions of the duct 146 is provided that help vary an angle of the fuel jet 152 in the three different pivot positions.

Figure 10:
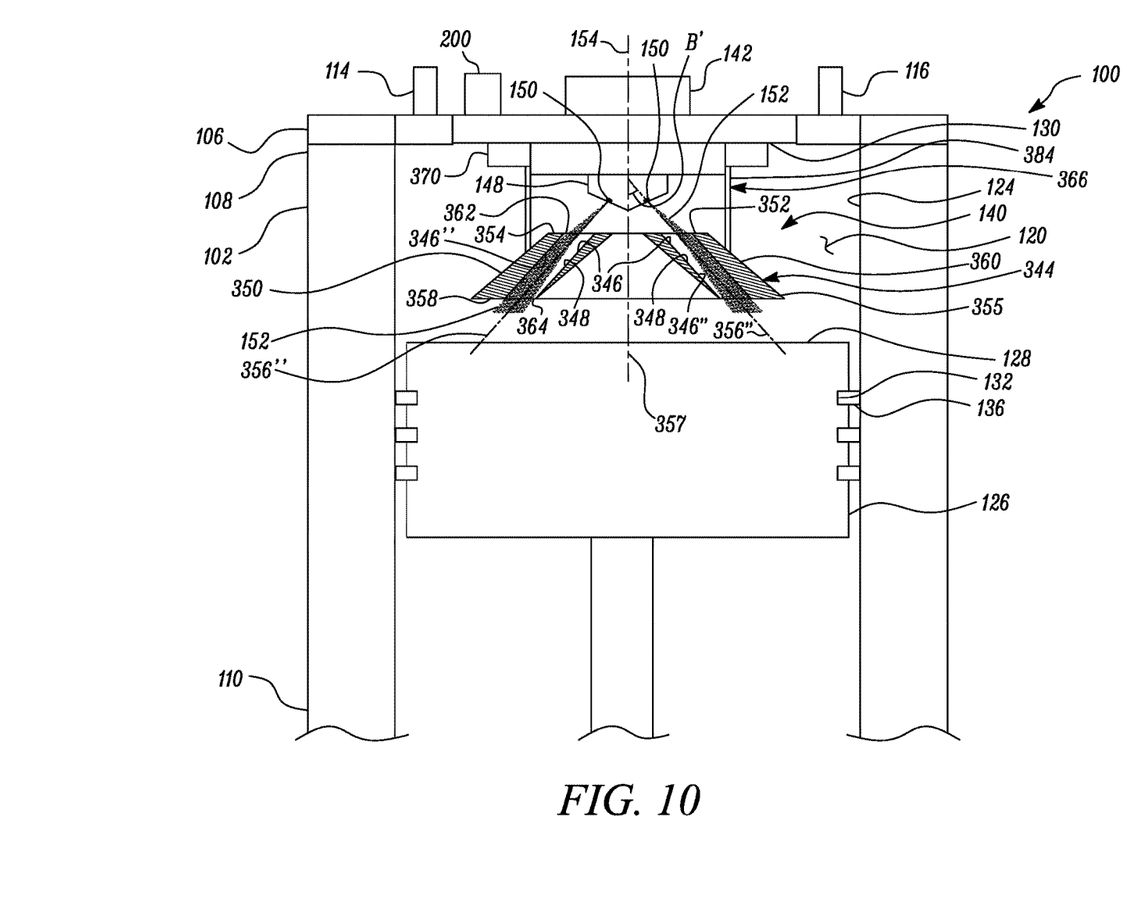
FIG. 10 illustrates a schematic view of the ducted combustion system having the duct system of FIG. 7, and depicting a sectional view of the conical disc structure showing a second set of ducts, in accordance with an embodiment of the disclosure.

In an embodiment, as shown in FIGS. 5-11, the controller 200 may move the plurality of the ducts 246, 346 by operating the corresponding actuator 270, 370 and moving/rotating at least one of the plurality of ducts 146 about the longitudinal axis 154 of the fuel injector 142. As shown in FIGS. 8 and 9, the first set of ducts 246', 346' are in alignment with the orifices 150 to receive the fuel jets 152. The first set of ducts 246', 346' direct the fuel jets exiting the corresponding ducts 246', 346' at the first angle A, A', relative to the longitudinal axis 154 of the fuel injector 142. To vary an angle of the fuel jets 152, the at least one actuator 270, 370 is actuated by the controller 200 to move the plurality of ducts 246, 346. In doing so, the first set of ducts 246', 346' moves out of alignment relative to the orifices 150 and the second set of ducts 246'', 346'' moves into alignment with the orifices 150. As the second set of ducts 246'', 346'' directs the fuel jets 152 exiting the corresponding ducts 246'', 346'' at the second angle B, B' (as shown in FIGS. 10 and 11), by a movement of the plurality of ducts 246, 346, the controller 200 varies the angle of fuel jets 152 relative to longitudinal axis 154 of the fuel injector 142.

By varying an angle of the fuel jet 152, in a manner as described above, according to the engine operating parameters, an improved mixing of the fuel with the air in the combustion chamber 120 is achieved. Further, by changing a direction of the fuel jet in the combustion chamber 120, an adherence of the fuel with the cylinder walls may be reduced, thereby reducing formation of soot inside the cylinder 102.

What is claimed is:

1. A ducted combustion system for an internal combustion engine, the ducted combustion system comprising:
   a combustion chamber defined between a flame deck surface of a cylinder head of the internal combustion engine and a piston crown of a piston disposed within a cylinder bore of the internal combustion engine;
   a fuel injector configured to inject fuel into the combustion chamber as a plurality of fuel jets; and
   a plurality of ducts disposed within the combustion chamber between the flame deck surface and the piston crown, the plurality of ducts being disposed such that each of the plurality of fuel jets at least partially enters one of the plurality of ducts, at least one of the plurality of ducts being configured to move to vary an angle of a corresponding at least one of the plurality of fuel jets relative to a longitudinal axis of the fuel injector.

2. The ducted combustion system of claim 1 further including at least one actuator to move the at least one of the plurality of ducts.

3. The ducted combustion system of claim 1 further including a support structure to support each of the plurality of ducts in the combustion chamber, each duct being defined by a tubular structure pivotably coupled to the support structure about a pivot axis.

4. The ducted combustion system of claim 3 further including at least one actuator configured to rotate each duct about the pivot axis.

5. The ducted combustion system of claim 4, wherein each duct includes a first end pivotably coupled to the support structure, and a second end coupled to the at least one actuator.

6. The ducted combustion system of claim 1, wherein the plurality of ducts includes a first set of ducts and a second set of ducts, wherein each of the first set of ducts defines a first axis and each of the second set of ducts defines a second axis, an angle of the first axis relative to the longitudinal axis of the fuel injector being different from an angle of the second axis relative to the longitudinal axis of the fuel injector.

7. The ducted combustion system of claim 6, wherein the plurality of ducts is defined by a plurality of passages formed in a frusto-conical disc structure.

8. The ducted combustion system of claim 6, wherein each of the plurality of ducts is defined by a tubular structure.

9. The ducted combustion system of claim 6, wherein the fuel injector includes a plurality of orifices to discharge the plurality of fuel jets, the plurality of ducts being configured to rotate about the longitudinal axis of the fuel injector, wherein the plurality of ducts is rotated to align either the first set of ducts or the second set of ducts with the plurality of orifices.

10. An internal combustion engine, comprising:
   a combustion chamber defined between a flame deck surface of a cylinder head of the internal combustion engine and a piston crown of a piston disposed within a cylinder bore of the internal combustion engine;
   a fuel injector configured to inject fuel into the combustion chamber as a plurality of fuel jets;
   a plurality of ducts disposed within the combustion chamber between the flame deck surface and the piston crown, the plurality of ducts being disposed such that each of the plurality of fuel jets at least partially enters one of the plurality of ducts; and at least one actuator configured to selectively move at least one of the plurality of ducts to vary an angle of a corresponding at least one of the plurality of fuel jets relative to a longitudinal axis of the fuel injector.

11. The internal combustion engine of claim 10 further including a support structure to support each of the plurality of ducts in the combustion chamber, each duct being defined by a tubular structure pivotably coupled to the support structure about a pivot axis.

12. The internal combustion engine of claim 11, wherein the at least one actuator is configured to move each duct about the pivot axis.

13. The internal combustion engine of claim 12, wherein each duct includes a first end pivotably coupled to the support structure, and a second end coupled to the at least one actuator.

14. The internal combustion engine of claim 13, wherein the at least one actuator includes a spring actuator, the spring actuator configured to pivot the corresponding duct about the pivot axis based on a fuel flow force acting on the corresponding duct.

15. The internal combustion engine of claim 10, wherein the plurality of ducts includes a first set of ducts and a second set of ducts, wherein each of the first set of ducts defines a first axis and each of the second set of ducts defines a second axis, an angle of the first axis relative to the longitudinal axis of the fuel injector being different from an angle of the second axis relative to the longitudinal axis of the fuel injector.

16. The internal combustion engine of claim 15, wherein the plurality of ducts is defined by a plurality of passages formed in a frusto-conical disc structure.

17. The internal combustion engine of claim 15, wherein the fuel injector includes a plurality of orifices to discharge the plurality of fuel jets, the plurality of ducts being configured to rotate about the longitudinal axis of the fuel injector, wherein the plurality of ducts is rotated to align either the first set of ducts or the second set of ducts with the plurality of orifices.

18. A method for operating a ducted combustion system, comprising:

injecting a plurality of fuel jets from a fuel injector into a combustion chamber;

directing each of the plurality of fuel jets into a corresponding one of a plurality of ducts disposed within the combustion chamber; and selectively moving at least one of the plurality of ducts to adjust an angle of a corresponding at least one of the plurality of fuel jets relative to a longitudinal axis of the fuel injector.

19. The method of claim 18, wherein moving the at least one of the plurality of ducts includes moving at least one of the plurality of ducts about a pivot axis of each corresponding duct, wherein the pivot axis of each duct is defined by a pivotable connection of each duct with a support structure.

20. The method of claim 18, wherein moving the at least one of the plurality of ducts includes moving at least one of the plurality of ducts about the longitudinal axis of the fuel injector to align one of a first set of ducts or a second set of ducts with the plurality of fuel jets, wherein each of the first set of ducts defines a first axis and each of the second set of ducts defines a second axis, an angle of the first axis relative to the longitudinal axis of the fuel injector being different from an angle of the second axis relative to the longitudinal axis of the fuel injector.

* * * * *